R. L. JOBSON.
HOT BEARING ALARM.
APPLICATION FILED JAN. 27, 1911.

1,035,710.

Patented Aug. 13, 1912.

Witnesses
Lloyd W. Patch
Elsie P. White

Inventor
Raymond L. Jobson
By Lewis Bagger
Attorneys

UNITED STATES PATENT OFFICE.

RAYMOND L. JOBSON, OF KINSTON, NORTH CAROLINA.

HOT-BEARING ALARM.

1,035,710.     Specification of Letters Patent.     Patented Aug. 13, 1912.

Application filed January 27, 1911. Serial No. 605,092.

*To all whom it may concern:*

Be it known that I, RAYMOND L. JOBSON, a citizen of the United States, residing at Kinston, in county of Lenoir and State of North Carolina, have invented certain new and useful Improvements in Hot-Bearing Alarms, of which the following is a specification.

My invention relates to an improvement in hot bearing alarms, and the object is to provide a body provided with a reservoir, in which mercury is received, and the mercury upon being heated comes in contact with a needle extending in a throat in the body, whereby an electrical contact will be made for sounding an alarm.

The invention consists in certain novel features of construction and combinations of parts which will be hereinafter fully described and pointed out in the claim.

Figure 1:
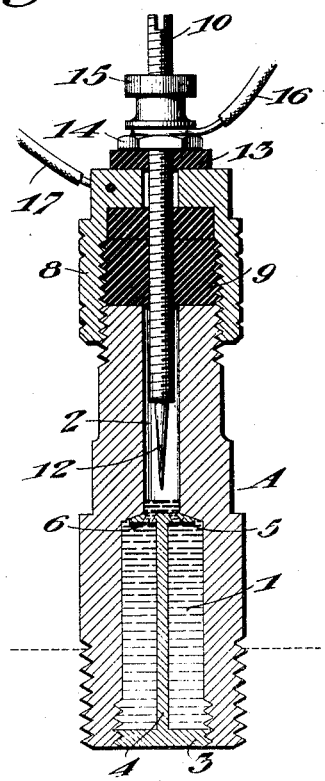
Figure 2:
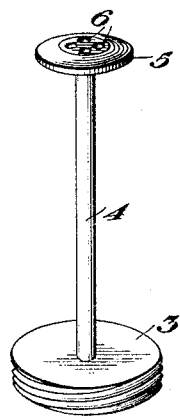

In the accompanying drawings: Figure 1 is a vertical sectional view through the invention; and Fig. 2 is a perspective view of the splasher disk.

A represents the body which is preferably of metal, and 1 is a reservoir formed at the lower end of the body. A throat or channel 2 extends from the reservoir to the upper end of the body. The bottom 3 of the reservoir is provided with screw threads which engage the internal screw threads of the reservoir, the bottom being fastened in by some suitable cement, to prevent the leakage of the mercury which is received in the reservoir. Connected to the bottom 3 is a rod 4, upon the upper end of which is mounted a disk 5 having openings or perforations 6 therein. The disk 5 is received at the base or lower end of the throat 2, and the mercury when expanded by the heat will pass through the openings or perforations 6 in the disk 5, into the throat 2.

The disk 5 prevents the mercury from splashing up into the throat 2, and coming in contact with the electrical contact point. It is intended to prevent the liquid from splashing up into the throat, and to permit the mercury to pass through the perforations in the disk when the mercury becomes expanded due to the heat of the journal bearing, and thereby allowing the mercury to pass into the throat only upon the expansion of the mercury through the perforations in the disks.

A screw cap 8 is screwed upon the upper end of the body, and between the top of the screw cap and the top of the body is an insulation 9. A screw threaded stem 10 passes through the upper end of the cap and through the insulation 9 into the throat 2. The stem is provided at its lower end with a needle point 12, which is adapted to come in contact with the mercury rising in the throat. An insulated disk 13 is mounted on the stem and upon the upper end of the cap, 8, and received upon the insulated disk 13 is a nut 14. A thumb nut 15 is received upon the stem, and received between the thumb nut and the nut 14 is an electric wire 16, an electric wire 17 being connected to the cap 8.

The lower end of the body A is screw threaded on its exterior surface, whereby the body can be screwed into a journal bearing or box, whereby the mercury in the reservoir will receive the heat when the bearing becomes heated, and when the bearing becomes overheated, the mercury in the reservoir will expand, passing through the perforations in the disk 5, into the throat 2, and will come in contact with the needle on the stem 10, whereby an electric circuit will be created through the wires 16 and 17.

The stem 10 is capable of vertical adjustment in the throat 2. When it is desired to lower the stem, it is first necessary to loosen the nuts 14 and 15, when the stem can be turned by a screw driver and lowered into the throat. When the stem is to be raised, it is necessary to loosen the nuts and re-set them on the stem for holding it in its adjusted position.

Having fully described my invention, what I claim as new and desire to secure by Letters Patent, is:

A heat alarm comprising a body having a mercury reservoir therein, a throat extending from the reservoir through the body, insulation received upon one end of the body, a cap connected to the body for holding the insulation in place, a screw threaded stem passing through the insulation into the throat, means for locking the stem in the throat, and a perforated disk supported at the base of the throat for preventing the mercury from splashing into the throat, but allowing the mercury to pass through the perforations and come in contact with the stem.

In testimony whereof I affix my signature, in the presence of two witnesses.

RAYMOND L. JOBSON.

Witnesses:
E. W. CHADWICK,
CHAS. A. WATERS.